United States Patent Office 3,440,914
Patented Apr. 29, 1969

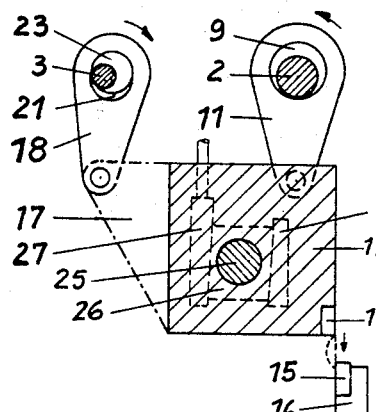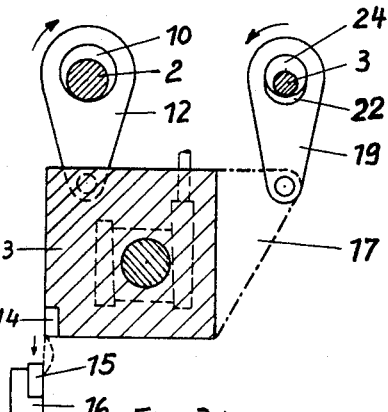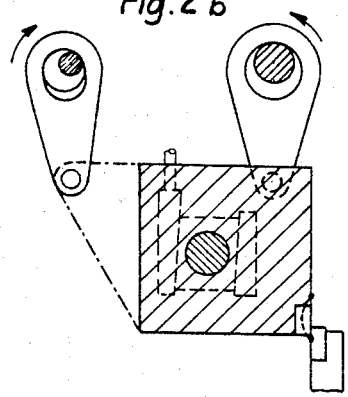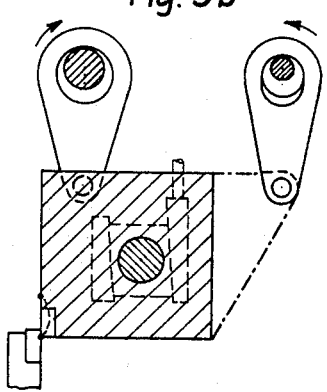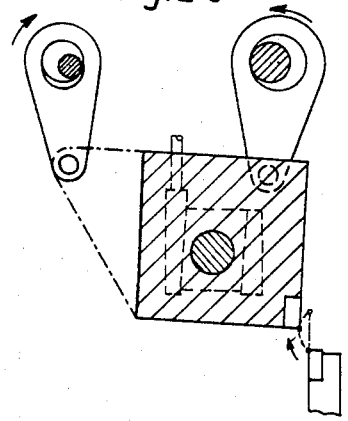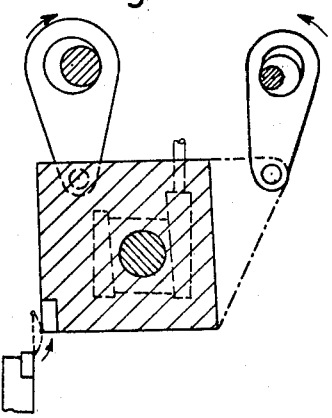

3,440,914
FLAT-BLADE TRIMMING SHEARS
Ernst-August Klein, Dusseldorf-Gerresheim, Germany, assignor to Schloemann Aktiengesellschaft, Dusseldorf, Germany, a German company
Filed Oct. 20, 1966, Ser. No. 588,200
Claims priority, application Germany, Oct. 28, 1965, Sch 37,937
Int. Cl. B26d 5/08
U.S. Cl. 83—556                                     2 Claims

ABSTRACT OF THE DISCLOSURE

Flat-blade border shears, wherein the upper blade beam is driven by cranks on a main crankshaft and press-rods, and is lifted away from the cut edge during the return stroke of the shear by thrust-arms connecting a lever on the upper blade beam with further cranks on an auxiliary crankshaft turning at the same speed as the main crankshaft but leading it by an angle, each of the thrust-arms being formed with an elongate aperture by which it engages its associated crank.

---

This invention relates to flat-blade trimming shears, in which the upper blade beam, driven by crank and press rods, is removed from the cut edge during the return stroke, in order to obviate wear of the upper blade by the sliding thereof along the cut edge.

In such shears the lifting is effected by providing, on the upper blade beam, a lever to which the crank of an auxiliary crankshaft, the speed of revolution of which corresponds to that of the main crankshaft, is pivoted by way of a thrust-arm, the dead-centre positions of the main and auxiliary crankshafts being different, in such a way that upon the rectilinear stroke movement of the upper blade beam a rocking movement is superimposed, the upper blade being being exactly guided over the entire course of the movement on the housing. The movement of the upper blade is in this way rendered elliptical, which does not prove disadvantageous in punch-cutting, since the actual cutting takes place in the region of the slight curvature, and at the lower turning point is already ended with a horizontal movement which is greater in comparison therewith.

In punch-cutting, however, steps or notches occur on the margin of the sheet, since, owing to the simultaneous complete severance of the border strip, a fresh cut is started practically every time. In order to obviate this disadvantage, the procedure has recently been adopted of at first leaving the border strip hanging on the sheet, and only severing it by means of the transverse blade during the succeeding cut. The border strip thus serves as a guide for the blade, so that a smooth and uninterrupted continuance of the cut is ensured. In this case the actual cutting is effected not only in the central region of the working stroke, but right to the lowest position of the blade, which has the result that the greater horizontal movement in this region may disadvantageously affect the quality of the cut.

The aim of the present invention is therefore to provide a shear in which a cutting movement of the upper blade which is completely rectilinear over the entire stroke is followed by a return stroke which provides a gradually starting lifting movement of the blade away from the cut edge.

According to the invention this aim is attained by attaching to the lever of the upper blade beam the thrust arm of a further crank, the dead-centre positions of which coincide with those of the main crankshaft, the thrust-arms of both cranks being accommodated, with a slot-like widening of their bearing aperture in a longitudinal direction, upon the associated crank-pin, and the crank with the dead-centre position deviating relatively to the crank aligned upon the main crank being angularly displaced in the direction of revolution.

In a further development of the invention, the crank aligned upon the main crank is arranged, together with the angularly displaced crank, upon the auxiliary crankshaft. The working stroke is thus effected in a straight line, by the uniform downward movement of the crankpin of the main crankshaft with one pin of the auxiliary crankshaft, the second pin of the auxiliary crankshaft, angularly displaced in the through-pass direction, being without bearing in the slot-like aperture of its thrust-arm. The angularly displaced pin of the auxiliary crankshaft, after passing beyond the lower dead centre, comes into bearing contact above in the slot of its thrust-arm, and now carries, in the further course of the return stroke, the blade-beam lever, whereby there is superimposed upon the return stroke a tilting movement lifting the blade away from the cut edge.

One embodiment of the invention is illustrated by way of example in the accompanying drawings, in which:

FIGURE 2 shows a simplified section on the line II—II in FIGURE 1, transverse to the shafts, in front of a thrust arm, in three working positions, 2a, 2b and 2c;

FIGURE 3 shows a simplified section on the line III—III in FIGURE 1, transverse to the shafts, in front of the other thrust-arm, in the corresponding working positions 3a, 3b and 3c.

Figure 1:
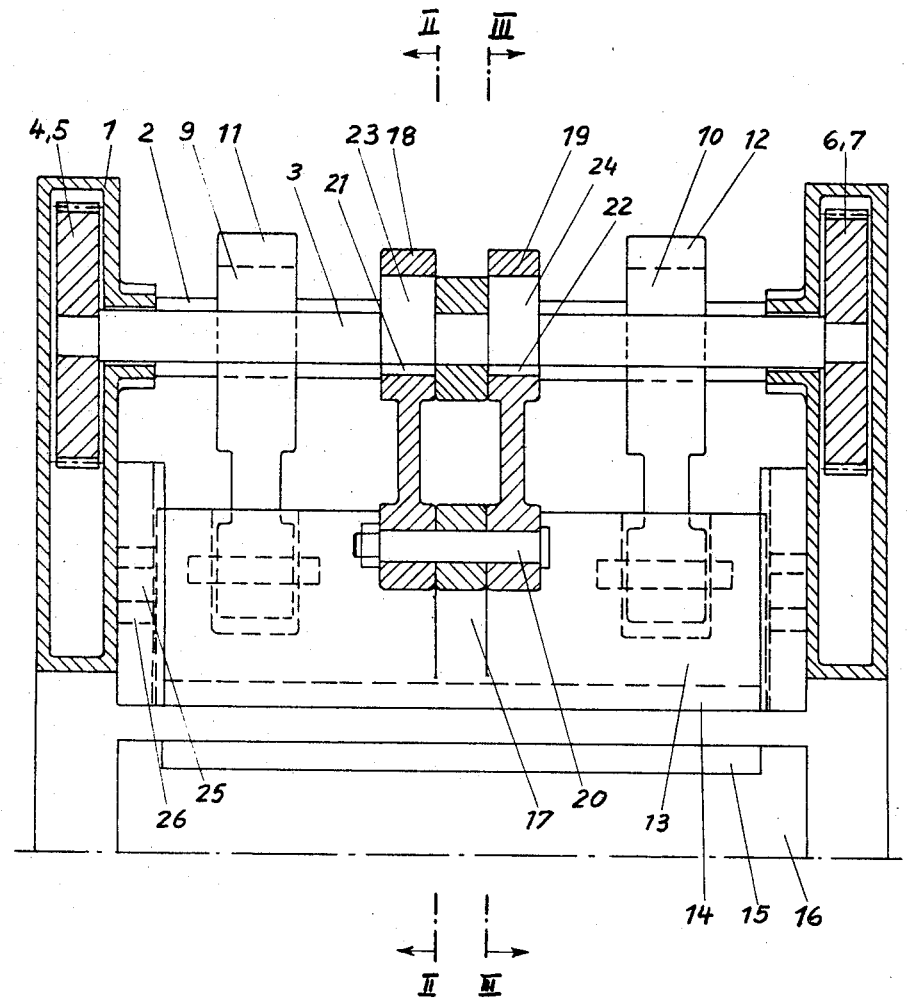
FIGURE 1 shows a section in the vertical axial plane of the auxiliary crankshaft.
Figure 4:
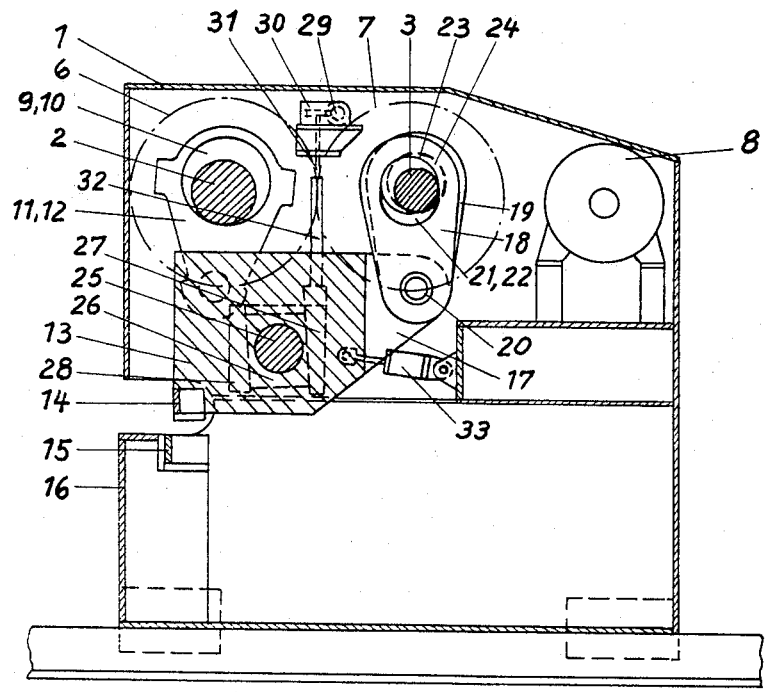
FIGURE 4 shows a complete representation.

In the housing cheeks of the frame 1 a main crankshaft 2 and an auxiliary crankshaft 3 are journalled parallel to one another, and are operatively connected, by toothed wheels, 4, 5, 6, 7, with equal numbers of teeth, secured upon their ends, these wheels being driven by a motor 8.

The main crankshaft 2 accommodates upon its cranks 9 and 10 press-rods 11 and 12, which are connected with the upper blade beam 13, to which the upper blade 14 is secured.

The lower blade 15 is connected with the lower blade beam 16.

The upper blade beam 13 is provided on the rear side with a lever 17, to which are pivoted, one on each side, upon a bolt 20, a thrust-arm 18 and a thrust arm 19, which are provided at the upper end with slot-like apertures 21 and 22 respectively, with which they are supported upon the cranks 23 and 24 of the auxiliary crankshaft 3. The crank 23 is angularly displaced in the direction of revolution relatively to the cranks 9 and 10 of the main crankshaft 2, in such a way that the thrust-arm 18 mounted upon it leads the press-rods 11 and 12 of the main crankshaft. The dead centres of the crank 24 agree however with those of the cranks 9 and 10 of the main crankshaft 2.

The synchronism of the cranks 9, 10 and 24 effects, during the cutting stroke, an absolute straightness, the crank 23 running in agreement in the slot without any controlling function, since it leads the crank 24 downwards (FIGURES 2a, 3a). Immediately after the lower dead centre (FIGURES 2b and 3b), the controlling function goes over to the crank 23, since the latter now assumes a higher position than the crank 24. From there onwards the blade movement proceeds on an arcuate course, so that the blade 14 is moved away from the cut edge (FIGURES 2c and 3c). The blade movement is shown dotted in FIGURES 2a to 2c and 3a to 3c.

The upper blade beam 13 is accommodated in a combination of a vertical straight-line guide with a pivotal suspension. For this purpose there is anchored, parallel to the blade 14, in the upper blade beam 13, a shaft 25, upon the journal of which, projecting beyond the upper blade beam, is slipped a slide 26 provided with a suitable bearing aperture. Two slide-pieces 27 and 28, of wedge-shaped construction, and of opposite inclination, are so arranged one on each side of the slide 26 as to be vertically displaceable on the housing cheeks of the frame 1, the slide piece 27 being displaceable and the slide-piece 28 stationary. An adjusting motor 29, by way of a worm drive 30, a spindle 31 and tension rods 32, one on each side of the blade beam, effects the joint displacement of the slide-pieces 27, whereby a horizontal movement for the adjusting of the blade gap is obtained. For the elimination of the clearance there serves an auxiliary cylinder 33.

I claim:

1. Flat-blade border shears for trimming metal sheets, comprising: a frame, a lower blade beam carried by the frame, a lower blade mounted on the lower blade beam, a main crank-shaft and an auxiliary crankshaft journaled parallel to one another in the frame, means for driving the two crank-shafts at the same speed of revolution but with different dead-center positions, cranks on the main crankshaft, crankpins carried by the said cranks, an upper blade beam, press-rods connecting the upper blade beam with some of the said crankpins, a lever attached to the upper blade beam, a thrust-arm connecting this lever pivotally with one of the crankpins of the auxiliary crankshaft, in such a way as to superimpose a rocking movement upon the rectilinear stroke movement of the upper blade beam, and a guiding system causing the upper blade beam to execute, during its return stroke, a movement lifting the upper blade away from the cut edge of a trimmed sheet, the said guiding system comprising: a further crank, the dead-center positions of which agree with those of the cranks on the main crankshaft and a further thrust-arm, connecting this further crank with the lever attached to the upper blade beam, each of the two thrust-arms being formed with an elongated aperture by which it engages its associated crankpin.

2. Flat-bed border shears as claimed in claim 1, the two cranks with which the said thrust arms are connected both being mounted upon the auxiliary crankshaft.

References Cited

UNITED STATES PATENTS 3,246,552   4/1966   Sieger _____ 83—556 X

ANDREW R. JUHASZ, *Primary Examiner.*